(12) United States Patent
Kenner et al.

(10) Patent No.: US 7,343,415 B2
(45) Date of Patent: Mar. 11, 2008

(54) DISPLAY OF SOFTWARE NOTES INDICATING THAT CONTENT FROM A CONTENT PROVIDER SITE IS AVAILABLE FOR DISPLAY

(75) Inventors: Martin A. Kenner, Burnsville, MN (US); Brian Westover, Fridley, MN (US); Peter M. Eisenberg, Minneapolis, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 911 days.

(21) Appl. No.: 09/821,202

(22) Filed: Mar. 29, 2001

(65) Prior Publication Data

US 2002/0143950 A1    Oct. 3, 2002

(51) Int. Cl.
 *G06F 15/16* (2006.01)
 *G06F 3/00* (2006.01)
(52) U.S. Cl. .................................... 709/227; 715/759
(58) Field of Classification Search ............... 709/227, 709/217–219; 715/759
See application file for complete search history.

(56) References Cited

U.S. PATENT DOCUMENTS

| | | | |
|---|---|---|---|
| 4,555,775 A * | 11/1985 | Pike ........................... 715/790 |
| 4,769,636 A * | 9/1988 | Iwami et al. ................ 715/790 |
| 4,783,648 A | 11/1988 | Homma et al. |
| 4,819,189 A | 4/1989 | Kikuchi et al. |
| 5,321,811 A * | 6/1994 | Kato et al. .................. 345/520 |
| 5,629,717 A * | 5/1997 | Netsu ........................... 345/98 |
| 5,638,501 A * | 6/1997 | Gough et al. ................ 345/639 |
| 5,727,164 A | 3/1998 | Kaye et al. |
| 5,732,275 A | 3/1998 | Kullick et al. |
| 5,768,528 A | 6/1998 | Stumm |
| 5,790,790 A | 8/1998 | Smith et al. |
| 5,805,163 A * | 9/1998 | Bagnas ....................... 715/768 |
| 5,877,762 A * | 3/1999 | Young ......................... 715/803 |
| 5,898,432 A * | 4/1999 | Pinard ......................... 715/861 |
| 5,974,454 A | 10/1999 | Apfel et al. |
| 5,978,807 A | 11/1999 | Mano et al. |
| 6,003,067 A * | 12/1999 | Suzuki et al. ............... 709/204 |
| 6,011,537 A | 1/2000 | Slotznick |
| 6,049,671 A | 4/2000 | Slivka et al. |
| 6,067,582 A | 5/2000 | Smith et al. |
| 6,131,096 A * | 10/2000 | Ng et al. ...................... 707/10 |

(Continued)

FOREIGN PATENT DOCUMENTS

EP    0 528 597 A2 *    2/1993

(Continued)

OTHER PUBLICATIONS author="Peter Daifuku", title ="A Fully Functional Implementation of Layered Windows", journal=The X Resource, volume ="5", number="1", ISBN="1-56592-020-1", pages="239-249", year="1993", url="citeseer.ist.psu.edu/daifuku93fully.html".*

(Continued)

*Primary Examiner*—Zarni Maung (57) ABSTRACT

First program code is executed at a content recipient so as to identify a content provider having posted content of interest to the content recipient. Second program code is executed at the content recipient so as to automatically access the content provider and initiate receipt by the content recipient of the posted content.

26 Claims, 7 Drawing Sheets

U.S. PATENT DOCUMENTS

| | | | |
|---|---|---|---|
| 6,134,584 A | 10/2000 | Chang et al. | |
| 6,151,021 A | 11/2000 | Bergquist et al. | |
| 6,167,567 A | 12/2000 | Chiles et al. | |
| 6,282,709 B1 | 8/2001 | Reha et al. | |
| 6,314,565 B1 | 11/2001 | Kenner et al. | |
| 6,327,572 B1 | 12/2001 | Morton et al. | |
| 6,327,617 B1 | 12/2001 | Fawcett | |
| 6,360,366 B1 | 3/2002 | Heath et al. | |
| 6,418,555 B2 | 7/2002 | Mohammed | |
| 6,473,756 B1 | 10/2002 | Ballard | |
| 6,493,871 B1 | 12/2002 | McGuire et al. | |
| 6,542,943 B2 | 4/2003 | Cheng et al. | |
| 6,557,026 B1 * | 4/2003 | Stephens, Jr. | 709/203 |
| 6,636,965 B1 | 10/2003 | Beyda et al. | |
| 6,675,212 B1 | 1/2004 | Greenwood | |
| 6,714,222 B1 * | 3/2004 | Bjorn et al. | 715/839 |
| 6,721,740 B1 | 4/2004 | Skinner et al. | |
| 6,745,224 B1 | 6/2004 | D'Souza et al. | |
| 6,813,768 B1 | 11/2004 | Cragun | |
| 6,834,306 B1 * | 12/2004 | Tsimelzon | 709/228 |
| 6,963,908 B1 | 11/2005 | Lynch et al. | |
| 2001/0016834 A1 | 8/2001 | Yamanaka et al. | |
| 2002/0010922 A1 * | 1/2002 | Darin et al. | 725/32 |

FOREIGN PATENT DOCUMENTS

| | | |
|---|---|---|
| EP | 0 967 559 A1 | 12/1999 |
| EP | 1 003 098 A2 * | 5/2000 |
| JP | 403085629 A * | 4/1991 |
| JP | 405053750 A * | 3/1993 |
| JP | 410011261 A * | 1/1998 |
| JP | 410083271 A * | 3/1998 |
| JP | 2000-18141 | 6/2000 |
| WO | WO 99/65014 | 12/1999 |

OTHER PUBLICATIONS

Transparent layered user interfaces: an evaluation of a display design to enhance focused and divide, Conf. on Human Factors in Computing Systems archive Proc. of the SIGCHI conf. on Human factors in computing systems table of contents, Denver, Colorado, US, pp. 317-324, Year of Publication: 1995, ISBN:0-201-84705-1.*

Mastering Microsoft Office '97, Professional Edition, 2nd Edition, Moseley & Boodey, SYBEX, Inc., 1996, p. 1-5.*

Triggering Information by Context, P. J. Brown, Springer-Verlag London Ltd, Personal Technologies (1998), p. 18-27.*

FieldNote: a Handheld Information System for the Field, N Ryan, J Pascoe, D Morse—1st Intl. Workshop on TeloGeoProcessing, 1999, p. 1-5.*

The Stick-e Document: A Framework for Creating Context-aware Applications, P.J. Brown—Electronic Publishing-CHICHESTER, 1995, p. 259-272.*

The Stick-E Notes Architecture: Extending the Interface Beyond the User, Pascoe J., IUI '97, ACM 0-89791-839-8/96/01, p. 261-264.*

A Component and Message-Besed Architectural Style for GUI Software, Research Paper, Taylor, et. al., 2000, http://www.soe.ucsc.edu/~ejw/papers/c2-icse17.pdf, p. 1-10☐☐.*

Perspective Layered Workspace for Collaborative Work, 1999 International Workshops on Parallel Processing, Sep. 1999, Wakamatsu, Japan (abstract).*

Leveraging Quality, Migrating a Mature, High-Level GUI Framework to Java, Schultheiss, B. & Fussel, M.L.*

"Technique For Annotating A Document Page"—IBM Technical Disclosure Bulletin, IBM Corp. New York, US vol. 34, No. 10B, Mar. 1, 1992, pp. 53-54 XP000302574, ISSN: 0018-8689. The whole document.

* cited by examiner

DISPLAY OF SOFTWARE NOTES INDICATING THAT CONTENT FROM A CONTENT PROVIDER SITE IS AVAILABLE FOR DISPLAY

RELATED APPLICATIONS

The present application contains subject matter similar to that disclosed in U.S. application Ser. No. 09/821,190 filed Mar. 29, 2001 and in U.S. Application Ser. No. 09/821,191 filed Mar. 29, 2001.

TECHNICAL FIELD OF THE INVENTION

The present invention relates to an arrangement which allows software notes posted at a content provider site to be accessed by a content recipient.

BACKGROUND OF THE INVENTION

Network enabled devices such as computers, televisions, personal digital assistants, telephones, games, etc. are currently used to access information and applications from remote sites over internal and external networks. An example of an external network which offers information and applications is the Internet. Sites that offer such information and applications are typically referred to as content providers, and the users of network enabled devices that permit the remote access of the information and applications are typically referred to as content recipients.

The applications offered by content providers include e-commerce applications which allow content recipients to purchase or sell products and/or services, bidding applications which allow content recipients to bid on products and/or services, reverse bidding applications which allow content recipients to accept bids for products and/or services, stock trading applications, and the like. Information offered by content providers include database information, advertisements, bulletin board information, and the like.

Information and/or applications are usually disseminated to content recipients who access content providers in response to specific requests for the information and/or applications. One of the problems with this approach is that the content recipient must often navigate through an extensive web page and/or many web pages to focus in on the desired information and/or applications.

In some instances, this problem can be avoided by automatically disseminating the information and/or applications from the content providers to the content recipients. For example, a content recipient who wishes to receive notices of new product or service offerings may request the retailer to automatically send notices of such offerings to the content recipient. Thus, the retailer may send an e-mail, for example, to the content recipient for each new offering.

One problem with this practice is that the identity of the content recipient is known to the content provider. Thus, the content provider can provide the content recipient's identity to other content providers who may then provide the content recipient with communications that the content recipient may not wish to receive.

The present invention overcomes one or more of these or other problems.

SUMMARY OF THE INVENTION

In one aspect of the present invention, a method is performed at a content recipient and comprises the following: executing first program code at the content recipient so as to receive content from a content provider; and, executing second program code at the content recipient so as to display the content behind a session if the session is active.

In another aspect of the present invention, a computer readable storage medium stores program code which, when executed by a computing device, performs the following functions: automatically initiating a request to receive content from a content provider; receiving the content from the content provider in response to the request; and, displaying the content behind a session if the session is active.

In yet another aspect of the present invention, a method comprises the following: executing first program code at a content provider so as to post content for access by a content recipient; and, executing second program code at the content recipient so as to automatically (i) access the content provider, (ii) initiate receipt by the content recipient of the posted content, (iii) receive the posted content, and (iv) display the posted content behind a session if the session is active.

BRIEF DESCRIPTION OF THE DRAWING

These and other features and advantages will become more apparent from a detailed consideration of the invention when taken in conjunction with the drawing in which.

DETAILED DESCRIPTION

Figure 1:
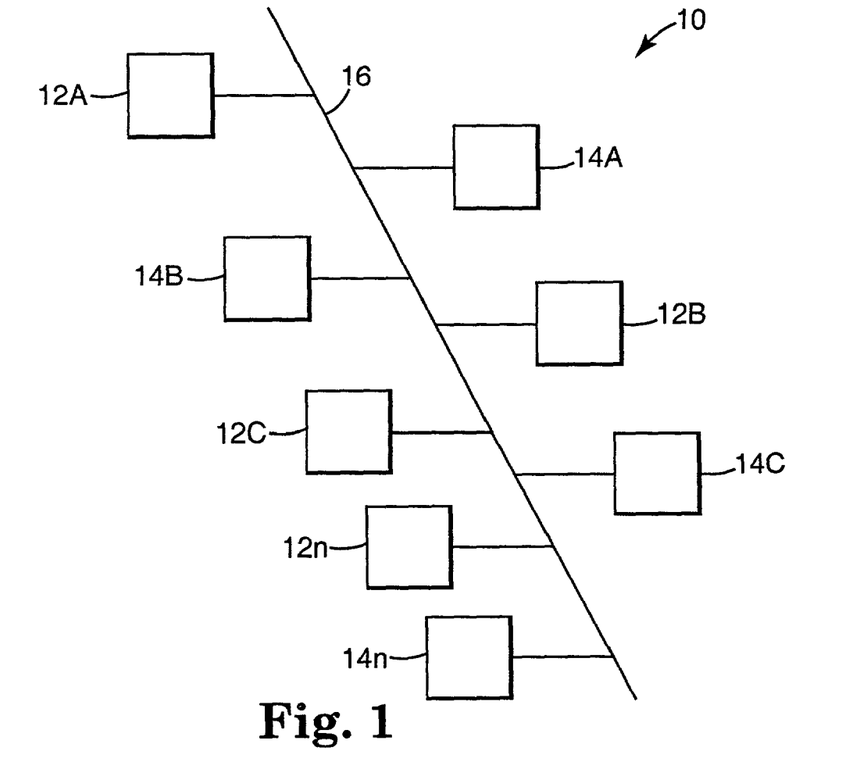
FIG. 1 illustrates an arrangement which provides an exemplary environment for the present invention.

An arrangement 10 which supports the present invention is illustrated in FIG. 1. The arrangement 10 includes content providers 12A, 12D, 12C, . . . , 12n and content recipients 14A, 14B, 14C, . . . , 14n interconnected by a network 16 such as the Internet. Each of the content providers 12A, 12B, 12C, . . . , 12n may be one or more servers operated by a web site provider, an Internet service provider, a search engine provider, etc. As such, the content providers 12A, 12B, 12C, . . . , 12n offer content that may be transmitted to the content recipients 14A, 14B, 14C, . . . , 14n over the network 16. Each of the content recipients 14A, 14B, 14C, . . . , 14n may be one or more network enabled devices operated by a user such as a consumer, a business, an educational or governmental institution, a web site, etc.

Figure 2:
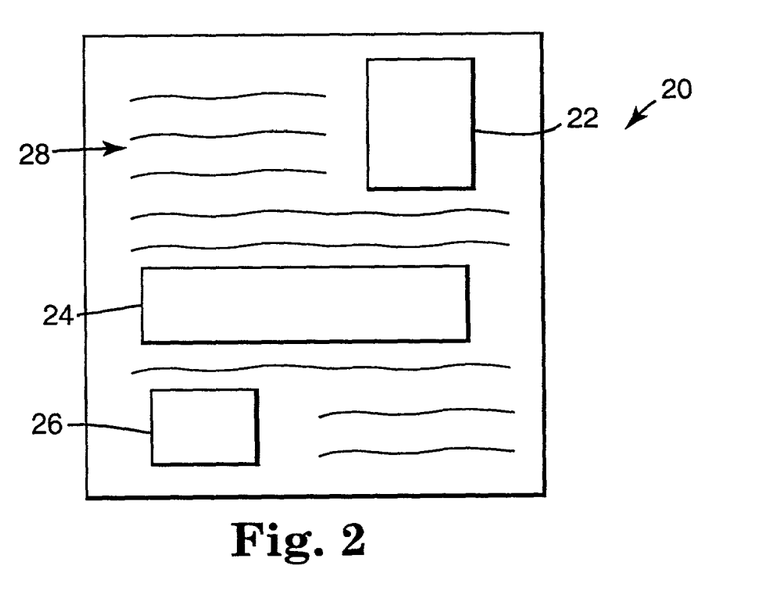
FIG. 2 illustrates an exemplary web page which may be provided by one or more of the content providers shown in FIG. 1.

In accordance with the present invention, one or more of the content providers 12A, 12B, 12C, . . . , 12n may carry web pages such as a web page 20 shown in FIG. 2. The web page 20 is meant to be exemplary only and may have any other format as desired. The web page 20 as shown in FIG. 2 has a plurality of elements such as a note 22, which may be a Software Post-it Note® provided by 3M, an advertising banner 24, a graphic 26, and text 28. The web page 20 may be provided by the content provider who posts the web page 20, or the web page 20 may be provided by third parties who may or may not pay the content provider to offer the web page 20. Alternatively, third parties may or may not pay the content provider to simply add material to the content provider's own web page. As is known, redirect URLs may be embedded in the advertising banner 24, the graphic 26, and/or the text 28 in order to re-direct the content recipient to other web pages posted by the content provider who posts the web page 20 or to the web pages of other content providers.

Figure 3:
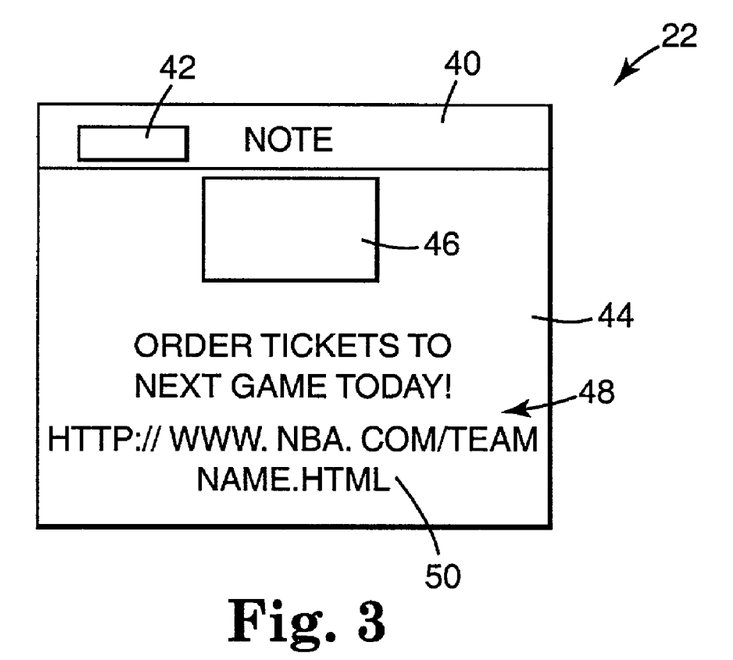
FIG. 3 illustrates an exemplary note delivered to a content recipient containing information posted by a content provider who also provides the exemplary web page shown in FIG. 2.

An example of the note 22 is shown in more detail in FIG. 3. The note 22 includes a title bar 40 which may carry a general title such as "Note" or a more specific title indicative of the product, service, and/or information offered by the note 22. A pull down menu icon 42 may also be present in the title bar 40 and, when clicked on, offers the content recipient with a choice of options such as alarm set, alarm reset, alarm unset, minimize/maximize, move to attachment container (memo board), move to trash, send note to another content recipient, and various note properties such as font, picture, color, etc. The note 22 also includes a display area 44 in which a graphic 46, text 48, and/or other material may be provided.

As illustrated in FIG. 3, the text 48 includes a URL 50. The URL 50 is preferably, but not necessarily, a live URL. The text 48 in the example of FIG. 3 offers tickets to a game to the content recipient. Assuming that the URL 50 is a live URL, the content recipient need only click on the URL 50 to initiate a function such as a purchase of a ticket. Clicking on the URL 50 may be arranged, for example, to direct the content recipient to the web site of a third party in order to purchase the tickets. Alternatively, clicking on the URL 50 may be arranged to return the content recipient to the content provider posting the web page 20 in order to permit the content recipient to purchase the tickets. As a further alternative, clicking on the URL 50 may be arranged to initiate the automatic purchase of the tickets, using previously provided payment and mailing instructions, from either the content provider providing the note 22, or from another web site coupled with the URL 50, or otherwise.

As suggested above, the note 22 may have other designs. For example, the note 22 need not include the URL 50 as an element thereof. Instead, the note 22 when received by the content recipient through a connection already established by the content recipient may instead include a box or other area which may be clicked on in order to begin the ticket purchase. This box or other area may contain a link to other web pages of the content provider or to a web page of a third party content provider so as to appropriately process the ticket purchase. As a further alternative, the link to the other web pages of the content provider or to the web page of the third party content provider may be provided as an option in the pull down menu accessed through the pull down menu icon 42.

Figure 4:
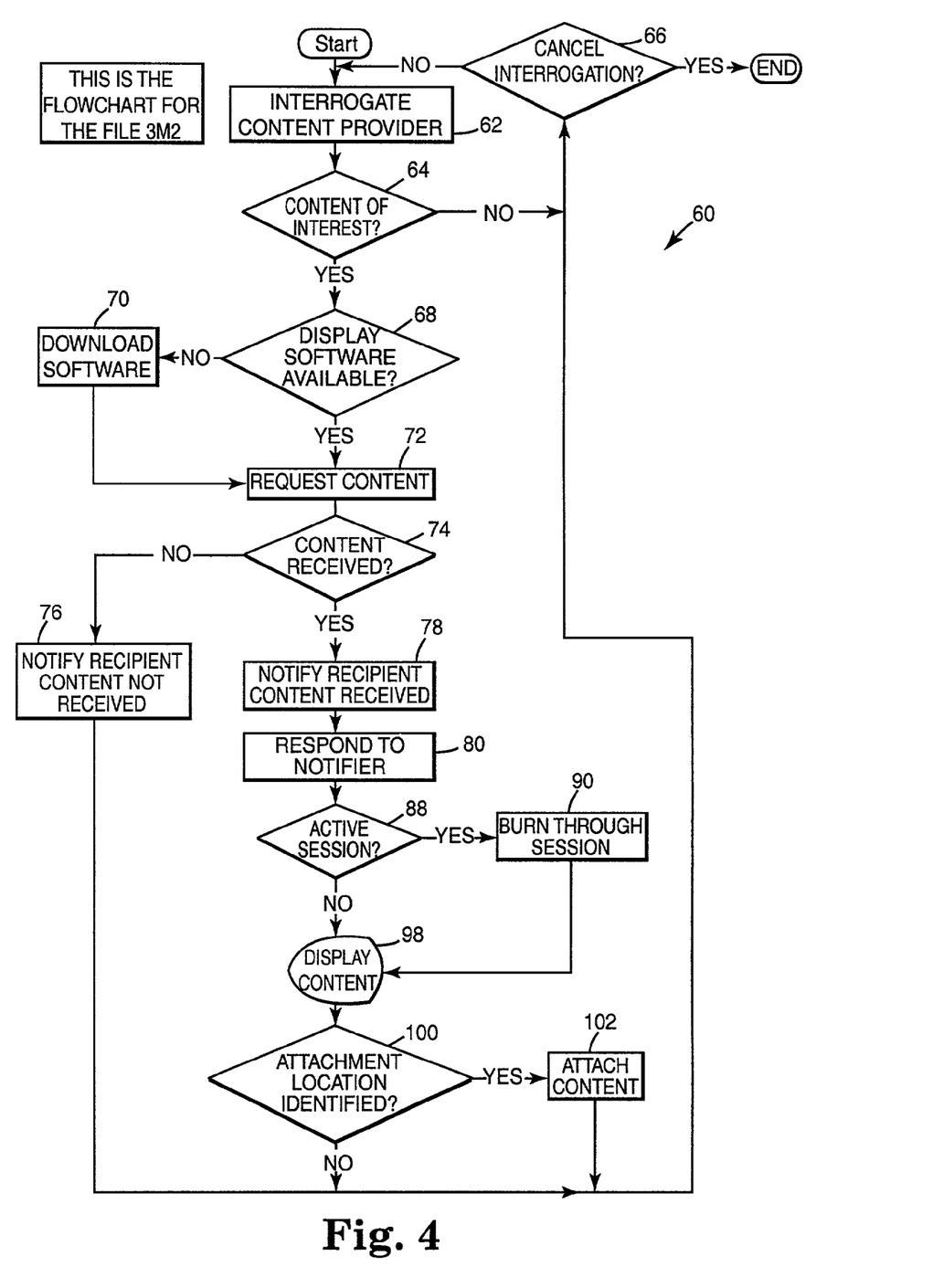
FIG. 4 is a flow diagram of program code that may be executed by the content recipients of FIG. 1.

The note 22 may be automatically accessed by a content recipient in accordance with the flow chart shown in FIG. 4. This flow chart represents a program 60 that is executed by the content recipient's network enabled device. The program 60 may be downloaded over the network 16 from a content provider to the content recipient whenever the content recipient accesses the content provider's web site and appropriately expresses a desire to automatically receive future offerings from the content provider. Moreover, the program 60 may be arranged to universally provide the same functions with respect to other content providers. Instead of downloading the program 60 over the network 16 from a content provider to the content recipient, the program 60 may be supplied to the content recipient on a disc or other memory device permitting the content recipient to load the program 60 into the content recipient's web enabled device.

Execution of the program 60 may be automatically initiated, for example, each time that the content recipient starts the content recipient's network enabled device or accesses the network 16 through the content recipient's network enabled device. Accordingly, each time that the program 60 is started, a block 62 of the program 60 identifies and interrogates the content provider associated with the program 60 and from whom the content recipient wishes to download new information, product offerings, service offerings, or other content. The block 62 may be arranged to target a single identified content provider or may be arranged to cycle through more than one identified content provider. For example, the identity of such content provider or content providers may be manually supplied to the program 60 by the content recipient at any time during the content recipient's use of the program 60. Alternatively, the identity of a specific content provider may be associated with that instance of the program 60 which is downloaded from that content provider by the content recipient. As a further alternative, the content recipient may have entered several content providers which the block 62 presents to the content recipient on a suitable display and requests the content recipient to select one of the listed content providers during each pass through the program 60.

The block 62, in any case, may be arranged to formulate and transmit a message to a content provider requesting any new content, which may be in the form of one or more notes such as the note 22, that have been posted on the content provider's web page 20 since the last interrogation.

The program 60 at a block 64 then determines whether the content recipient has received an indication from the interrogated content provider that the interrogated content provider has newly posted content that may be of interest to the content recipient. Such newly posted content may be in the form of one or more instances of the note 22 which have been newly posted by the content provider. If the content recipient has received an indication from the interrogated content provider that the interrogated content provider has no newly posted content that may be of interest to the content recipient, or if the content recipient receives no response within a predetermined time period, the program 60 at a block 66 displays a message asking the content recipient whether the content recipient wishes to cancel the current interrogation. If the content recipient wishes to cancel the current interrogation, the program 60 ends. On the other hand, if the content recipient does not wish to cancel the current interrogation, program flow returns to the block 62 where either the same content provider or a different content provider is interrogated.

If the content recipient has received an indication from the interrogated content provider that the interrogated content provider does have newly posted content that may be of interest to the content recipient as determined at the block 64, a block 68 determines whether the content recipient's network enabled device has the software necessary to display the content. For example, where the content is in the form of one or more instances of the note 22, the block 68 determines whether the content recipient's network enabled device has the software necessary to display the notes. This note displaying software is currently available from 3M. If the content recipient's network enabled device does not have the software necessary to display the content, a block 70 requests the download of the content display software either from the content provider being interrogated or from another content provider and installs the downloaded content display software when received.

When the content display software is installed at the block 70, or if the block 68 determines that the network enabled device of the content recipient already has the content display software, the program 60 at a block 72 requests download of the newly posted content of interest. The program 60 at a block 74 determines whether the newly posted content of interest has been received. If the block 74 determines that the newly posted content of interest has not been received within a predetermined amount of time, a block 76 causes the display of a message notifying the content recipient of the failure to receive the newly posted content of interest and program flow then returns to the block 66.

On the other hand, if the block 74 determines that the newly posted content has been received, a block 78 provides a notifier to the content recipient that the newly posted content of interest has been received. This notifier may take several different forms. For example, the notifier may be the content itself which is immediately displayed to the content recipient as the top active layer of any applications that the content recipient has running on the content recipient's network enabled device. Alternatively, the notifier may be a window or an icon or other symbol which is displayed in a tool bar, a title bar, inside a window frame, or at any other suitable location, as an indication to the content recipient that newly posted content has been received. In this latter case, the content may be received and stored in temporary memory and may be displayed upon suitable activation of the notifier at a block 80. For example, the content provider may click on the notifier in order to display the content.

Figure 5:
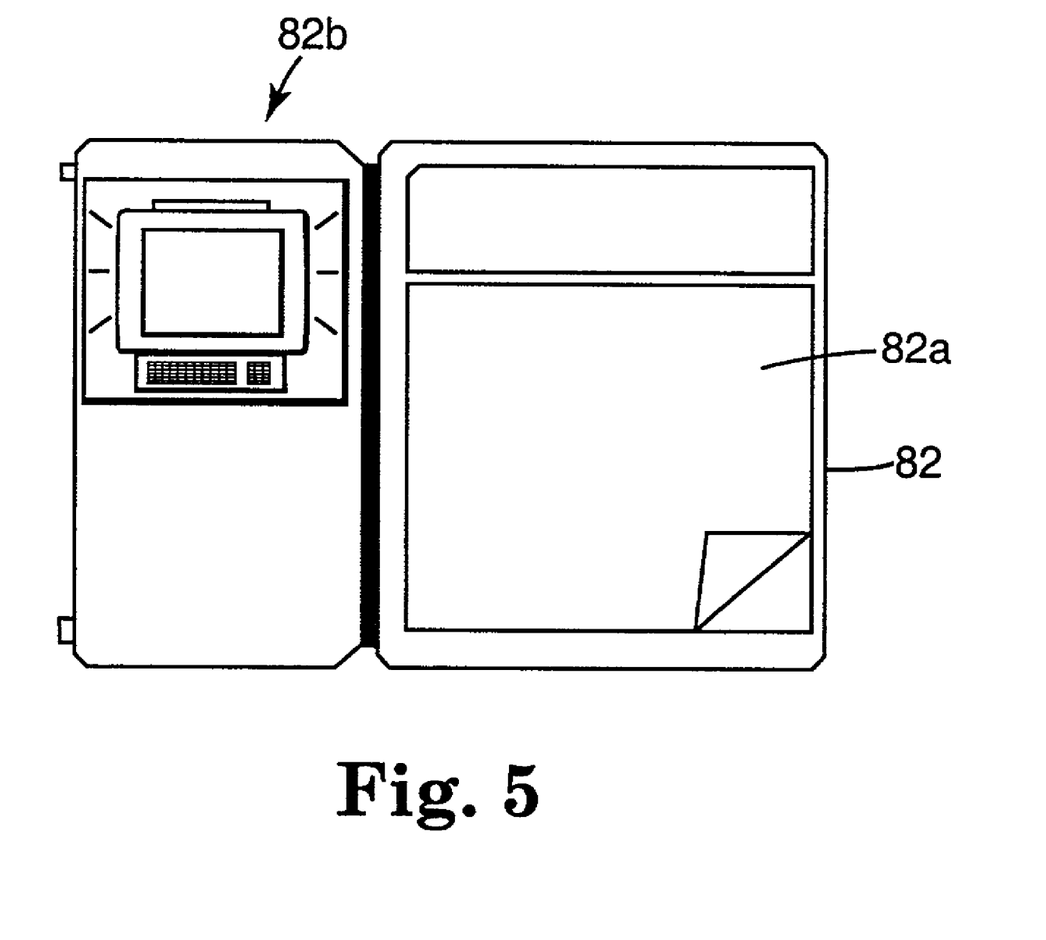
FIG. 5 is a representation of a screen display showing a notifier according to an embodiment of the present invention.
Figure 6:
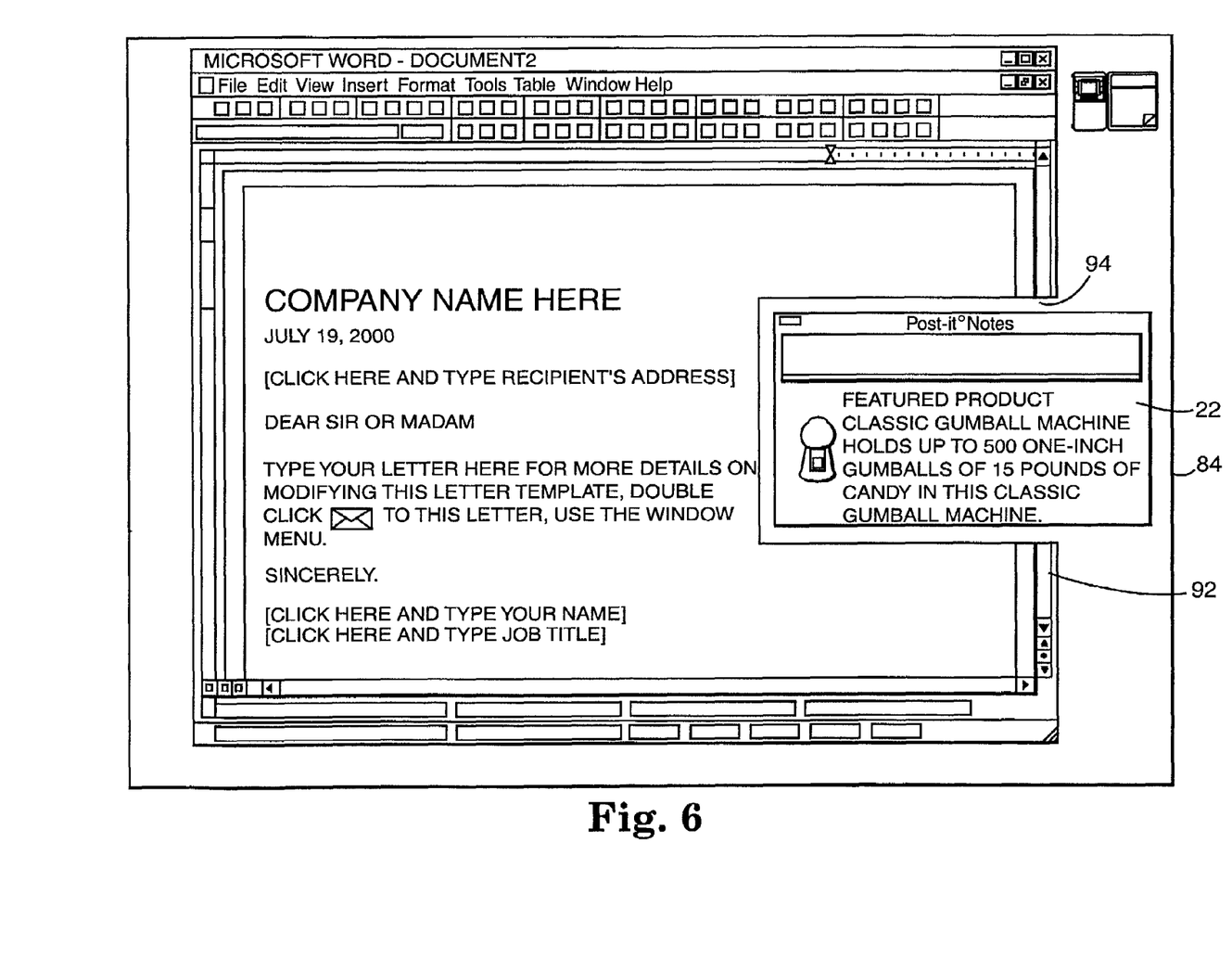
FIG. 6 is a representation of a screen display showing newly posted content burning through an active session so as to be displayed to a content recipient.

An exemplary notifier 82 of this alternative type is shown in FIG. 5 and is made to appear on a screen display such as a screen display 84 shown in FIG. 6, where the notifier 82 appears over a desktop. Although not shown in FIG. 6, if the notifier 82 is displayed as a window or icon at a predetermined location on the display, and if one or more windows are layered over this predetermined location, the notifier 82 is automatically displayed as a top most layer so that it is visible to the content recipient even though another application currently has the focus (i.e., is active).

As shown in FIGS. 5 and 6, the notifier 82 has two portions. A first portion $82_a$ is a symbol generally representing a pad of notes such as the note 22 shown in FIG. 3. A second portion $82_b$ is a symbol generally representing a personal computer displaying a note square. The first and/or second portion $82_a$ and/or $82_b$ may be made to flash in order to indicate that a note has been received and has not been opened by the content recipient. Also, the first and/or second portion $82_a$ and/or $82_b$ may have other locations such as in the system tray, in the system tool bar, in the application bar, etc.

When the content recipient activates the notifier 82 at the block 80, a block 88 of the program 60 determines whether there is an active session being performed by the content recipient. An active session, for example, may be an application which has the focus of the content recipient. If there is an active session as determined at the block 88, and if the active session is displayed in an area of the screen display to be occupied by the content when the content is made to appear upon activation of the notifier 82, the program 60 at a block 90 uses the content display software discussed above in order to burn the content through the active session being displayed.

Thus, as shown in FIG. 6, when the notifier 82 is activated, the note 22 is made to appear in a predetermined portion of the screen display 84 which happens to be partially occupied by a window 92. Accordingly, the window 92 is burned so that a border 94 is provided around the note 22. The border 94 allows whatever is in a layer below the window 92 to be seen through the border 94 around the note 22. Thus, the note 22 burns through the window 92 to expose a portion of the layer below the window 92.

In FIG. 6, the only layer below the window 92 is a desktop. Therefore, a portion of the desktop may be seen through the border 94. However, if a second window is layered below the window 92, a portion of this second layer, instead of a portion of the desktop, would then be exposed through the border 94. Alternatively, the note 22 may be arranged to burn through all layers between it and the desktop.

If there is no active session as determined by the block 88, or after a burn through is provided by the block 90, a block 98 causes the newly posted content of interest to be displayed within the burn through on the display of the content recipient's network enabled device. Thus, as shown in FIG. 6, the note 22 is displayed within the burn through portion of the window 92. Thereafter, a block 100 determines whether an attachment location is identified such as by the content recipient. If an attachment location is identified, the received content is attached to the identified location at a block 102.

The attachment location may be identified by clicking a cursor over a location to which the received content is to be attached. Alternatively, the attachment location can be a predetermined location within a window that is open and is active at the time that the received content is made to appear on the screen display. As a further alternative, when the received content first appears on the display screen of the content recipient's network enabled device, the received content may be un-attached. However, when the received content is dragged and dropped at a new location, it automatically attaches to the window or desktop under the cursor at the time of dropping. As a still further alternative, by clicking a first time on the received content and a second time at a desired location, the received content can be attached to the desired location as indicated by the cursor at the time of the second click.

Attachment may have one or more of the following attributes: the received content is made to appear whenever the location to which it is attached is made to appear or is visible; the received content is made to disappear whenever the location to which it is attached is made to disappear or is not visible; the received content is made to move whenever the location to which it is attached is moved, such as by scrolling or otherwise; the received content is automatically de-attached from a first location and re-attached to a second location whenever the received content is dragged from the first location and dropped at the second location; and/or the received document can be de-attached from one area of a display, such as a first window, and can be re-attached to a second area of the display, such as a second window. Attachment may have different attributes as well so that the attributes listed above are meant to be exemplary only.

The attachment location can be a calendar, an address book, a window, a document, a desktop, etc.

If an attachment location is not identified as determined at the block 100 or after the received content is attached at the block 102, program flow returns to the block 66.

Figure 7:
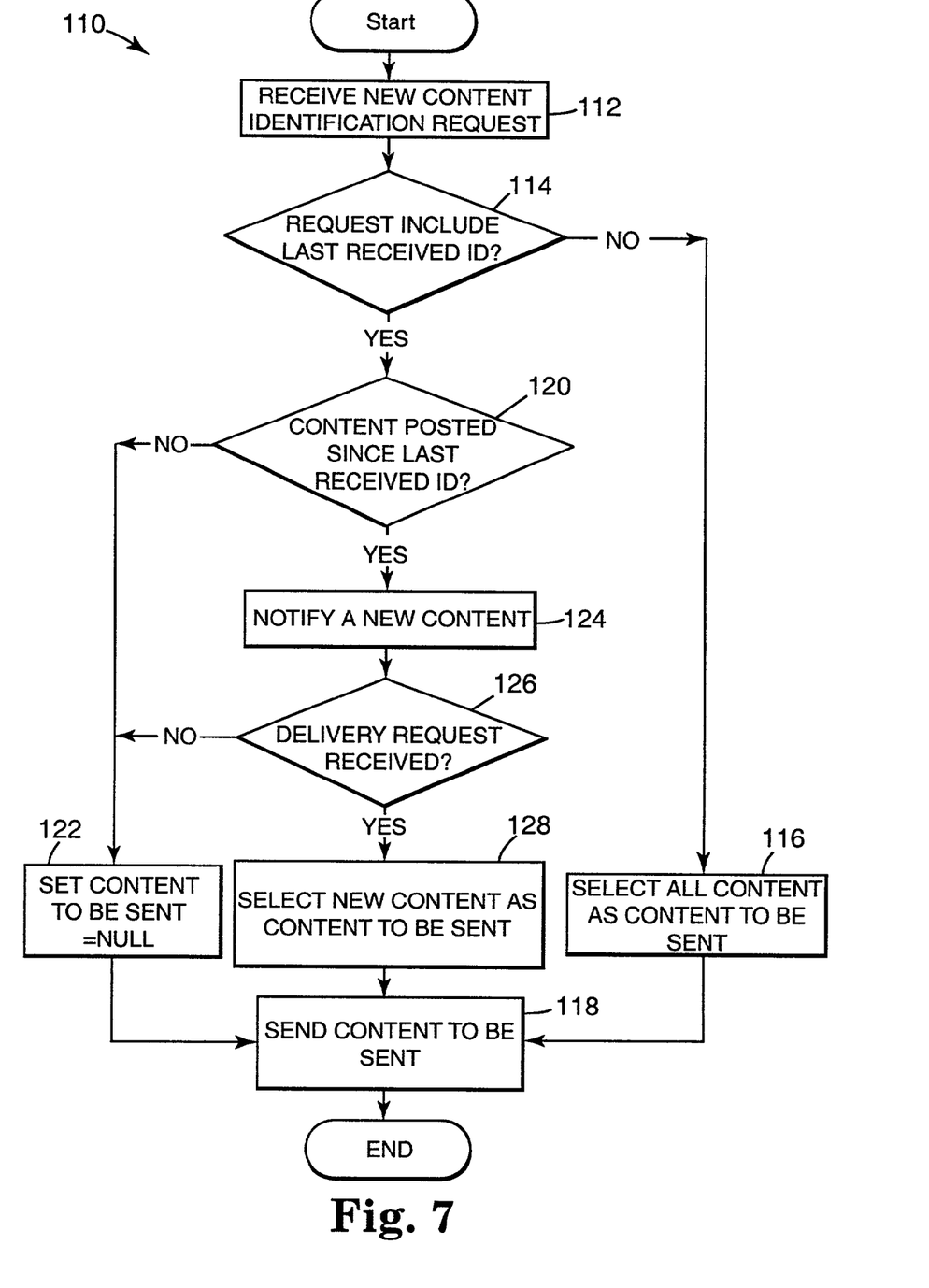
FIG. 7 is a flow diagram of program code that may be executed by the content providers of FIG. 1; and, FIGS. 8-11 show various methods that may be implemented in accordance with the present invention.

FIG. 7 is a flow diagram of program code that may be executed by the content providers of FIG. 1 in order to provide posted content of interest to the content recipient. This flow diagram represents a program 110 that is executed by a corresponding server of a content provider. When the program 110 is running, a block 112 of the program 110 receives a new content request from a content recipient. As discussed above, this new content may be in the form of notes such as the note 22. The new content request contains a unique identification of the content recipient's network enabled device. This identification need not, and preferably does not, identify the content recipient. Thus, the identification is only sufficient to determine which content, if any, has been previously supplied by the content provider to the requesting content recipient.

A block 114 determines whether the identification received at the block 112 was contained in a previous request. If not, a block 116 selects all currently posted content as the content to be sent to the content recipient, and a block 118 sends the selected content to the content recipient.

If the block 114 determines that the identification received at the block 112 was contained in a previous request, a block 120 determines whether any new content has been posted on the content provider's server since the previous request of the requesting content recipient. If not, a block 122 selects a null message indicating that there is no new content. The block 118 sends this message to the content recipient's network enabled device, which may display this message to the content recipient as desired.

If the block 120 determines that new content has been posted on the content provider's server since the previous request of the content recipient, a block 124 notifies the content recipient's network enabled device that there is new content. If a block 126 determines that a delivery request has been received from that the content recipient's network enabled device in response to the notification sent by the block 124, a block 128 selects only the content that has been posted since the content recipient's last request, and the block 118 sends the content selected at the block 128. On the other hand, if the block 126 determines that a delivery request has not been received from that the content recipient's network enabled device, the block 122 selects the null message described above, and the block 118 sends this null message to the content recipient's network enabled device.

A delivery request might not be received from the content recipient's network enabled device if, for example, there has been a network failure. A delivery request might also not be received from the content recipient's network enabled device if there has been as machine shut down. For example, because many of the operations performed by content recipient's network enabled device in executing the program 60 are background tasks, the content recipient might be unaware that a note is being sent to the content recipient's network enabled device and may inadvertently shutdown the device during process of receiving a note. Alternatively, the content recipient might shutdown while receiving a note because of time constraints. In these circumstances, the null message sent to the content recipient indicates that the process had not finished.

After the content selected at the block 116 has been sent at the block 118, or after the null message selected at the block 122 has been sent at the block 118, or after the content selected at the block 128 has been sent at the block 118, the program 110 waits for the next request.

Figure 8:
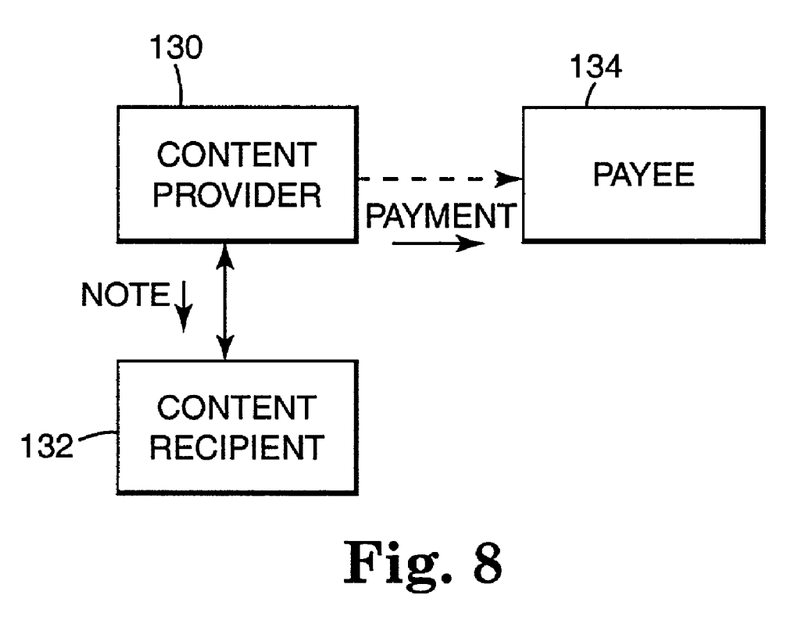

These or similar features of the present invention can be used in a number of different business models. For example, as shown in FIG. 8, the note 22 may be newly posted by a content provider 130 acting as a first party. A content recipient 132 performs an activity related to the note, such as accessing or acquiring the note through use of the program 60, where the content recipient 132 is a second party. The content provider 130 provides payment to a payee 134 based upon the activity performed by the content recipient 132. In an example of this model, the payee 134 may have provided something of value to the content provider 130 that the content provider 130 is offering on its web site, and the content provider 130 has agreed to pay a fee to the payee 134. The fee may be a flat fee, or the fee may be paid each time that the content recipient 132 accesses that content, makes a purchase, or otherwise provides something of value in return for the content, or the like.

Figure 9:
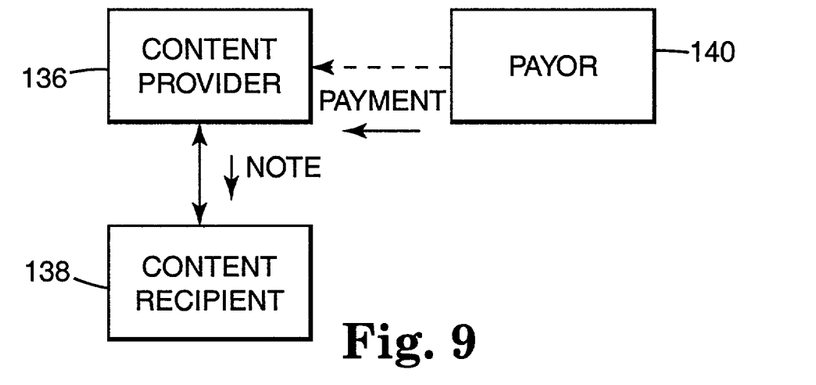

As shown in FIG. 9, the note 22 may be newly posted by a content provider 136 acting as a first party. A content recipient 138 performs an activity related to the note, such as acquiring the note through use of the program 60, where the content recipient 138 is a second party. Payment for the activity is provided to the content provider 136 by a payer 140. In an example of this model, the content provider 136 may be a surrogate host for content provided by the payer 140, and the payer 140 pays a fee to the content recipient 136 for this service. The fee may be a flat fee, or the fee may be paid each time that the content recipient 102 accesses the content, makes a purchase, or otherwise provides something of value in return for the content, or the like.

Figure 10:
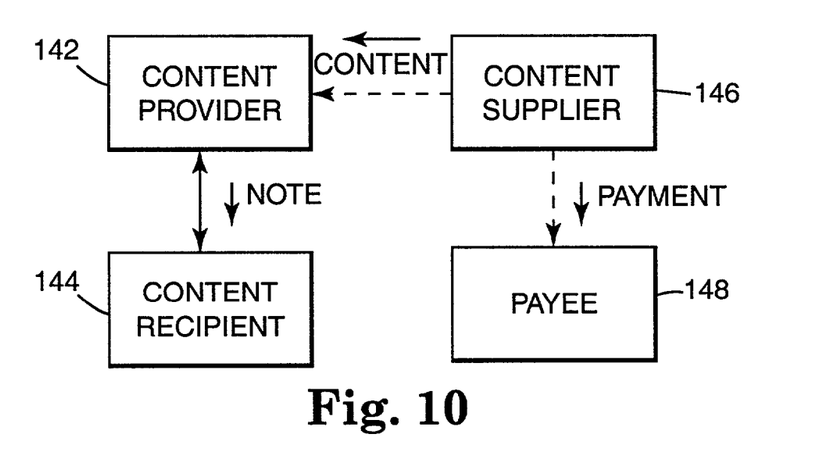

As shown in FIG. 10, the note 22 may be newly posted by a content provider 142 acting as a first party. A content recipient 144 performs an activity related to the note, such as acquiring the note through use of the program 60, where the content recipient 144 is a second party. The content posted by the content provider 142 is supplied to the content provider 142 by a content supplier 146. Payment is made by the content supplier 146 to a payee 148. In an example of this model, the payee 148 may be a creditor or a financial backer of the content provider 142 or a facilitator of the overall process, and the content supplier 146 may be providing payment because the content posted by the content provider 142 advertises products and/or services of the content supplier 146. As another example of this model, the payee 148 may have provided some portion of the content supplied to the content provider 142 by the content supplier 146 and the content supplier 146 provides a fee to the payee 146 for that portion.

Indeed, other fees may be exchanged between the various parties. For example, the content supplier 146 may also provide a fee to the content provider 142 for hosting the content supplied by the content supplier 146. Any of these fees may be any combination of the following: a flat fee; a fee that is paid each time that the content recipient 102 accesses the content; a fee that is paid each time that the content recipient 102 makes a purchase; a fee that is paid each time that the content recipient 102 otherwise provides something of value in return for the content; etc.

Figure 11:
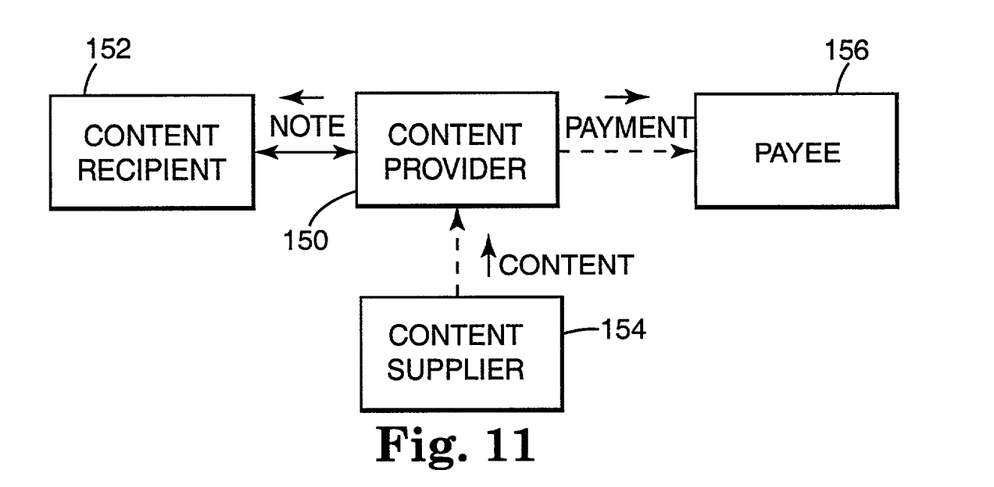

As shown in FIG. 11, the note 22 may be newly posted by a content provider 150 acting as a first party. A content recipient 152 performs an activity related to the note, such as acquiring the note through use of the program 60, where the content recipient 152 is a second party. The content posted by the content provider 150 is supplied to the content provider 150 by a content supplier 154. Payment is made by the content provider 150 to a payee 156. In an example of this model, the payee 156 may be a creditor or a financial backer of the content supplier 154 or a facilitator of the overall process, and the content provider 150 has agreed to pay a fee to the payee 156. The fee may be a flat fee or may be paid each time that the content recipient 152 accesses that content, makes a purchase or otherwise provides something of value in return based upon that content, or the like. As in the case of FIG. 10, other fees could also be paid in the business model of FIG. 11.

Other revenue options are also possible. For example, payment may be based upon the number of subscribers (content recipients) who request the automatic dissemination of notes from a content provider as described above in connection with FIGS. 1-7. As another example, payment may be required for the download of the program 60 to the content recipient's network enabled device. As still another example, payment may be required from the subscriber (content recipient) for the automatic dissemination of notes as described above in connection with FIGS. 1-7.

Accordingly, the present invention enables a content recipient to receive content in the form of the note 22 or otherwise without the need for the content recipient to provide his or her identity to the content provider. In this way, the privacy of the content recipient is assured and the content provider cannot disclose the content recipient's identity to others such as other content providers. If the content recipient no longer wishes to receive notes, the content recipient need only deactivate the program 60.

Certain modifications of the present invention have been discussed above. Other modifications will occur to those practicing in the art of the present invention. For example, the note 22 is shown above in connection with the ordering of ticket. However, the note 22 may be provided in connection with any other types of activities such as accessing or acquiring the note 22, making purchases of products and/or services, performing banking transactions, making bids, making reverse bids, performing searches, requesting or providing information, performing stock or other financial related transactions, downloading software, accessing media of various types, performing plural interactions through the same note 22, redeeming a coupon, printing a coupon, etc.

Moreover, as described above, newly posted content in the form of the note 22 is displayed on a content recipient's network enabled device within a burn through of the active session 88. Alternatively, instead of burning the note 22 through the active session 88, the note 22 may simply be displayed as a top layer having the focus. As a further alternative, the note 22 may be displayed as a top layer automatically upon receipt of the content or dependent upon the subject matter of the note 22 or upon an identity of the content provider or upon a user action.

Also, as described above, newly posted content in the form of the note 22 is burned through the active session 88 if the notifier is suitably activated at the block 80. Alternatively, newly posted content in the form of the note 22 may burn through the active session 88 automatically upon receipt of the content without the activation of the notifier. As a further alternative, newly posted content in the form of the note 22 may automatically burn through the active session 88 dependent upon the subject matter of the note or upon an identity of the content provider.

Furthermore, payment may be made based upon the following activities: placing an order, making a purchase, performing a banking transaction, making a bid, making a reverse bid, performing a search, requesting or providing information, performing a stock related transaction, downloading software, accessing media, etc. Payment may be also based upon a level (such as amount) of the relevant activity, upon receipt of the note by the content recipient, upon any type of interaction with the note by the content recipient such as clicking on the note by the content recipient, and/or upon any other interest in the note as expressed by the content recipient. Also, payment may be based upon combinations of the above activities. Additionally, if a content provider posts a plurality of notes, payment may be made based upon each posted note.

In addition, the notifier as described above is a visual notifier. However, the notifier may be an audible notifier instead of a visual notifier.

Moreover, as described above, the web page 20 is shown in FIG. 2 as containing the note 22. However, instead of, or in addition to, the note 22, the web page 20 can be arranged to contain a button or icon or other area offering a subscription to the information contained in the note 22. If the content recipient viewing the web page 20 elects to become a subscriber such as by activating the button or icon or other area or otherwise, the note 22 will be supplied to the content recipient such as in accordance with FIGS. 4 and 7.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

The invention claimed is:

1. A method performed at a content recipient comprising:
   executing first program code at the content recipient so as to receive content from a content provider;
   executing second program code at the content recipient so as to display the content behind a session if the session is active; and,
   executing third program code so as to display a notifier indicating that the content is available for display, wherein the notifier is displayed so as to be viewable while the content is being displayed behind the active session.

2. The method of claim 1 further comprising executing fourth program code at the content recipient so as to burn the content through the session in order to visibly display the content to a user.

3. The method of claim 1 further comprising executing fourth program code at the content recipient so as to display the notifier over the session even if the session is active, wherein the notifier indicates that the content is available for display.

4. The method of claim 1 further comprising executing fourth program code at the content recipient so as to burn the content through the session in response to selection of the notifier in order to visibly display the content to a user.

5. The method of claim 1 wherein the notifier is an icon.

6. The method of claim 1 further comprising electronically receiving the first and second program code at the content recipient from the content provider.

7. The method of claim 1 further comprising executing fourth program code at the content recipient so as to visibly display the content to a user by automatically layering the content over the session.

8. The method of claim 7 wherein the content is automatically layered over the session upon receipt of the content.

9. The method of claim 7 wherein the content is automatically layered over the session dependent upon subject matter of the content.

10. The method of claim 7 wherein the content is automatically layered over the session dependent upon an identity of the content provider.

11. The method of claim 7 wherein the content is immediately layered over the session upon receipt of the content provider.

12. The method of claim 7 wherein the content is layered over the session in response to a user action.

13. The method of claim 1 further comprising executing fourth program code at the content recipient so as to attach the content to an attachment site automatically upon receipt of the content.

14. The method of claim 13 wherein the attachment site is a calendar.

15. The method of claim 13 wherein the attachment site is an address book.

16. The method of claim 13 wherein the attachment site is a window.

17. The method of claim 13 wherein the attachment site is a document.

18. The method of claim 13 wherein the attachment site is a desktop.

19. The method of claim 1 further comprising executing fourth program code at the content recipient so as to layer the content over the session in order to visibly display the content to a user.

20. The method of claim 19 wherein the layering of the content over the session is in response to an action of the content recipient.

21. The method of claim 1 wherein the notifier comprises a visual notifier.

22. The method of claim 1 wherein the notifier comprises an audible notifier.

23. The method of claim 1 wherein the executing of first program code comprises executing the first program code so as to transmit a world wide web address of the content provider and to receive the content from a content provider in response to the world wide web address.

24. A method performed at a content recipient comprising:
    executing first program code at the content recipient so as to receive a note from a content provider, wherein the note contains content, and wherein the note has a property of automatic attachment to a window following dragging the note to and then dropping the note over the window; and,
    executing second program code at the content recipient so as to display the note behind a session if the session is active.

25. The method of claim 24 wherein the executing of first program code at the content recipient so as to receive a note comprises executing the first program code so as to automatically initiate a request to receive the note.

26. The method of claim 24 wherein the note has a property of automatic attachment such that the note automatically attaches to a window to which the note is dragged and then dropped.

* * * * *

UNITED STATES PATENT AND TRADEMARK OFFICE
CERTIFICATE OF CORRECTION

PATENT NO.         : 7,343,415                         Page 1 of 1
APPLICATION NO. : 09/821202
DATED               : March 11, 2008
INVENTOR(S)       : Martin A. Kenner It is certified that error appears in the above-identified patent and that said Letters Patent is hereby corrected as shown below:

Title Page, Page 2
Item (56), References Cited, Foreign Patent Documents:
    delete "2000-18141" and insert -- 2000-181841 -- therefore.

Item (56), References Cited, Other Publications:
    delete "TeloGeoProcessing" and insert -- TeleGeoProcessing -- therefore.
    delete "Message-Besed" and insert -- Message-Based -- therefore.
    delete "Fussel, M.L." and insert -- Fussel, M. L. 01/2000 -- therefore.

Column 2
Line 22, delete "DRAWING" and insert -- DRAWINGS -- therefore.
Line 26, delete "drawing" and insert -- drawings -- therefore.
Line 53, delete "12A, 12D," and insert -- 12A, 12B, 12D, -- therefore.

Signed and Sealed this

Twenty-second Day of July, 2008

JON W. DUDAS
*Director of the United States Patent and Trademark Office*